Nov. 5, 1963  R. G. SMITH  3,109,285
ACCESSORY POWER SYSTEM FOR AIRCRAFT
Filed Aug. 3, 1959

INVENTOR.
RAYMOND G. SMITH
BY
ATTORNEY

United States Patent Office 3,109,285
Patented Nov. 5, 1963

3,109,285
ACCESSORY POWER SYSTEM FOR AIRCRAFT
Raymond G. Smith, Derby, Kans., assignor to Boeing Airplane Company, Wichita, Kans., a corporation of Delaware
Filed Aug. 3, 1959, Ser. No. 831,365
8 Claims. (Cl. 60—35.6)

My invention concerns an accessory power system particularly adapted for aircraft operating at speeds of Mach 4 and above. The system selectively uses ram or engine compressor bleed air to power accessory units such as turbines, and is designed to be used in an aircraft in which the ram air reaches temperatures above the maximum temperature the accessory units can withstand. The high air temperatures are accommodated by the selective addition to the air of an evaporant material, i.e., water, so that mass flow is increased and the temperature is reduced to a level acceptable in the accessory units.

A source of accessory power is needed in aircraft for various purposes such as powering electrical, pneumatic and hydraulic systems. The power may be provided by sources other than ram or engine bleed air, such as auxiliary engines, solid propellant systems, batteries and mechanical drive from the turbine of the primary engine. However, ram or engine bleed air is often advantageous over such other sources because of weight or fuel savings or because of higher reliability. Reduction of ram air temperatures by heat exchanger methods would result in energy losses and in problems of temperature limitations of heat exchanger materials. The present limit on most accessory power turbines is about 2,000° R. Although it is possible to design a turbine for higher temperatures, such a turbine would be quite expensive and would have substantially increased weight.

The objects of my invention include: to provide an accessory power system selectively using ram and engine compressor bleed air and an evaporant material, for aircraft operating in the hypersonic ranges; to devise an accessory power system for high speed aircraft avoiding the limitations and disadvantages of the alternative systems mentioned above; and to provide an air-powered accessory power system for such aircraft in which air temperatures above the maximum temperature the system can withstand are prevented by the addition of an evaporant material to the air entering the system.

Figure 1:
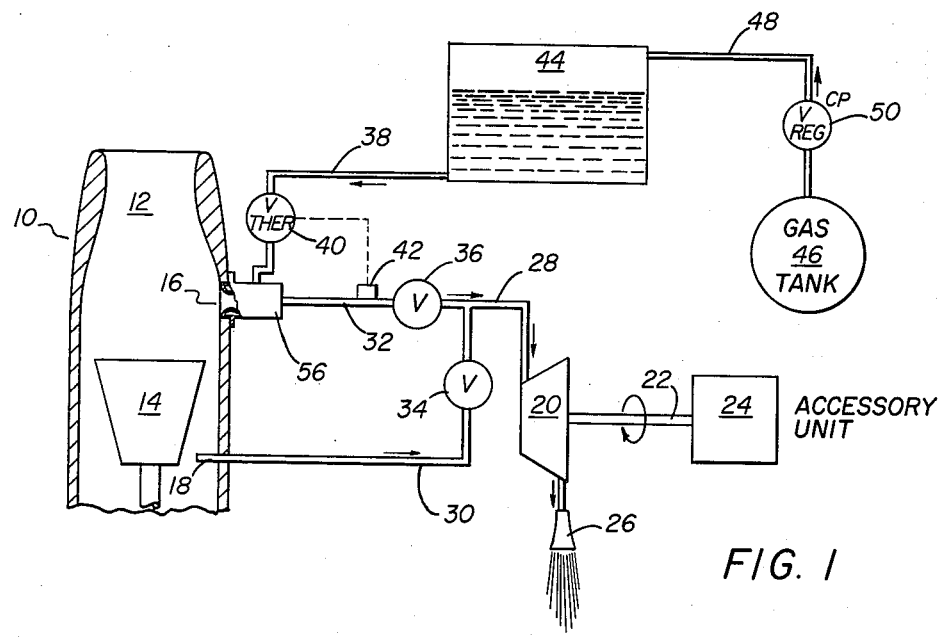
Figure 2:
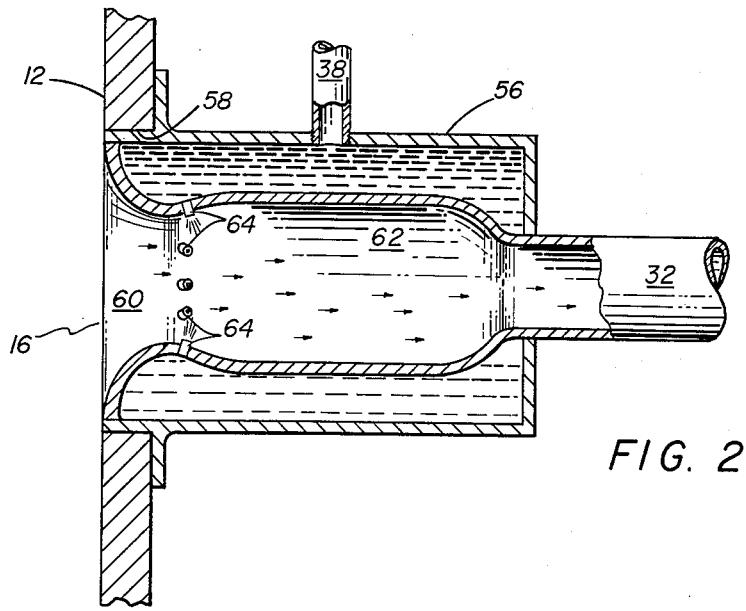

Further objectives and advantages of my invention will be understood from the following description, read with reference to the drawings, in which:

FIGURE 1 is a schematical view of an accessory power system forming a specific embodiment of my invention; and FIGURE 2 is an enlarged, fragmentary view, principally in section, showing details of the ram air inlet end of the system.

The present accessory power system is designed particularly for aircraft operating at least partly at about Mach 4 or above. Ram air temperatures of aircraft rise to a level above accessory turbine material temperature limits at about Mach 4. The word "aircraft," when used in the present description and the claims, is defined as including all vehicles, manned or unmanned, traveling in the atmosphere above the ground whether they have wings or instead are in the category of wingless missiles or the like.

Referring to FIGURE 1, engine 10 is indicated, as a specific embodiment, to be a turbo-ram jet combination bypass engine having an air passageway including an inlet duct and diffuser 12 and having a compressor 14 positioned in the ram air passageway rearward of the inlet duct portion 12. Air is taken from the air passage to power the accessory system, selectively through a ram air opening 16 in inlet duct 12 or through a compressor bleed air opening 18 in the area of compressor 14. It will be understood that other types of engines can be used that are suitable for hypersonic velocities, where excessive heating of ram air used in an accessory system is a problem. According to the complete system of the present invention, the aircraft should provide a source of ram air and a source of compressor bleed air. In the subcombination system where only ram air is used, any aircraft power plant could be used for the vehicle because the ram air duct does not have to be associated with the engine.

As a specific example, the accessory power system is shown as having a single accessory power turbine 20 that mechanically drives, through turbine shaft 22, one or more accessory units 24, such as hydraulic pumps, electric generators and air compressors. The turbine is exhausted to outside of the vehicle through exhaust nozzle 26 which expands the air to recover any available thrust.

Air is provided to turbine 20 through a common line 28 supplied by line 30 from compressor bleed air opening 18 or by line 32 from ram air opening 16. Valves 34 and 36 are provided in lines 30 and 32 respectively to control flow of air to common turbine supply line 28. The valves are operated, manually or automatically, to supply air to the turbine through compressor bleed line 30 when the engine is in turbojet operation and to supply air through ram air line 32 when the engine is switched to ram-jet operation at higher velocities.

An evaporant material is supplied to the ram air in line 32 when temperatures exceed the selected maximum temperature for the accessory system. Water is the preferred evaporant material, and supply of water through a supply line 38 is governed by a thermostatic control valve 40 having a sensing unit 42 installed on line 32 or in another location where ram air temperature can be sensed. A water supply tank 44 is pressurized by a gas tank 46, that may contain compressed air, connected to water tank 44 by a line 48 having interposed therein a constant pressure outlet valve 50, whereby positive supply of water is provided by applying a selected pressure to the water. Force or vacuum pumping could be used instead of a gas pressure system for supplying the water to the ram air line.

Water supply line 38 connects with a jacket 56 suitably secured in an opening 58 in the wall of inlet duct 12. Ram air inlet opening 16 is provided by an inlet section 60 and a mixing chamber section 62 forming the end of ram air supply line 32. This manifold assembly can be made in suitable sections and secured together by welding. Water injects from jacket 56 through a plurality of ports 64 into mixing chamber 62 where the hot ram air flashes the water into steam, FIG. 2. Thus when excessive ram air temperatures are sensed by sensing unit 42, thermostatic control valve 40 opens and water is fed to the ram air. The stream reaching turbine 20 is a mixture of air and steam having larger mass flow and a lower temperature than would be the case if water were not added to the ram air.

Although water is the preferred example and will be used on most occasions because of its good handling characteristics, its availability and economy, its desirable thermodynamic characteristics, etc., other evaporant materials may be used, preferably but not necessarily liquids in stored condition, and these other materials may have special characteristics desirable for certain installations, i.e., applications having particularly severe weight limitations. The expression "evaporant material" is defined as any suitable material having a boiling temperature below approximately 2000° R. (about the present limit for turbines), having a suitably high latent heat of vaporization, and having a flash point above the ram air temperatures experienced by the vehicle. The selection of an evaporant for any given vehicle will be understood by those working in the art and can be accomplished by consulting tables of the properties of the various materials. Water, when used, may be mixed with other liquids, i.e., alcohol, to impart additional properties such as depression of the freezing point. It may be noted that the selection of a material has some of the same problems as occur in selecting an evaporant liquid for nuclear reactors, i.e., see Patent 2,874,537.

*Operation*

The operation has been generally indicated above but will be briefly reviewed. The accessory system before take-off and during flight at low Mach numbers, is powered by compressor bleed air through line 30 by proper setting of valves 34 and 36. If the power plant does not have a compressor, some other source of power can be used, such as a stored gas or cartridge source, until ram pressure rises to a ram-jet operating level.

When the engine is switched to ram-jet operation, valves 34 and 36 are automatically or manually changed and turbine 20 is fed by ram air through line 32. Thermostatic valve 40 automatically opens when the ram air reaches a selected value, less than the materials temperature limit in the accessory system (now about 2000° R.), and water is fed into the ram air stream in mixing chamber 62. The rate of water feed may be fixed or variable and can be controlled by the size of ports 64, by use of the modulating thermostatic valve 40, or by other means. The rate should be sufficient to prevent the temperatures from rising beyond the acceptable limit. Substantially no energy is lost in accommodating higher temperatures by the addition of water as the water absorbs the heat and delivers the energy to the turbine. The water reduces the temperature of the gas reaching the turbine but compensates for this by adding to the mass flow.

The limit on ram air temperatures the accessory turbine can withstand is reached about Mach 4. Alternative accessory systems for high Mach number vehicles include liquid monopropellant and solid propellant systems. These have the disadvantage in weight and volume of carrying their oxidizer aboard the vehicle. One example of the present bleed-ram air accessory system, studied at Mach 7 and 100,000 feet altitude, showed a weight saving of 100% and a volume saving of 300% over the currently used liquid monopropellant and solid propellant accessory systems. Unique features of the present system include: (1) the coupling of bleed and ram air systems to drive the same power turbine, (2) the addition of water or other evaporant material to cool ram air and using the mixed air and superheated steam flow to drive the accessory power turbine, and (3) the cooling of ram air for power uses while not decreasing the energy available for power.

The study of the Mach 7, 100,000 ft. altitude vehicle example showed a ram air temperature of 4540° R. To reduce this temperature by previous methods, such as by a heat exchanger system, would result in a loss of energy delivered to the accessory turbine. Further, present known heat exchanger materials are limited to about 2000° R. A calculation was made as to the weight of water required to be carried by the vehicle under certain assumed conditions: (1) 200 horsepower required from turbine, (2) 8 minutes time required at Mach 7. The computed flow of the steam and air mixture was 28.9 lb./min., of which 8.95 lb./min. was water and 19.95 lb./min. was air (a ratio of water to air of 0.45). The weight of water required, thus, was 71.6 lb., and a 78.8 lb. water tank provides a 10% reserve. This weight compares favorably with that of competitive systems. The drag due to the system was .086 in.$^2$ in terms of the equivalent flat plate area, which is an acceptable level.

It has been proposed prior to the present invention to take off power for an auxiliary turbine from the propulsion nozzle of a rocket or the like and to cool the intake end of the system by adding water. The present accessory system is advantageous over a combustion gas system for accessory power in an aircraft. The use of products of combustion in an accessory system causes corrosion and fouling of parts. If the combustion stream is picked up forward of the end of the propulsion nozzle, a thrust penalty results because the propulsive gases are not permitted to completely expand. This thrust penalty, while not large in terms of the total primary power plant thrust, is large in terms of the amount of power used in the accessory system. If instead the combustion gases are picked up rearward of the exit nozzle, the pickup device, in the free air stream and in the nozzle stream, results in drag. A primary consideration in comparing the use of ram air and the use of combustion gases for accessory power is the weight of water to be carried aboard the aircraft. Combustion gas temperature is assumed at the conservative figure of 6500° R. and a pressure of 50 p.s.i.a. is used. A calculation was made, like the one set forth above, in which the same requirements were used, e.g., 200 horsepower required for 8 minutes duration. The computed flow of the stream of combustion gases and steam was 26.6 lb./min., of which 11.85 lb./min. was water and 14.75 lb./min. was combustion gas (a ratio of water to air of .804). The weight of water required, thus, was 94.8 lb., and a 104.5 lb. water tank would provide a 10% reserve. The difference in weight between the present system and the combustion gas system in the amount of weight of water required is substantial percentagewise, e.g., the combustion gas system takes about 30% more water. In aircraft design the conservation of such weights in the various parts adds up to a large total weight and substantially affects the range of the vehicle.

When the claims describe air powered accessory turbines, this statement is defined as specifying turbines powered by the expansion of air and as excluding turbines powered by the expansion of combustion gases.

Having thus specifically described my invention, I do not wish to be understood as limiting myself to the precise details of construction shown, but instead wish to cover those modifications thereof that will occur to those skilled in the art from my disclosure and that fairly fall within the scope of my invention, as described in the following claims.

I claim:

1. An accessory power system for an aircraft operable at least at Mach 4 having an engine including a compressor and a ram air inlet duct and said aircraft having an air powered accessory power turbine, independent of the aircraft propulsion power plant which includes said engine, to supply power to one or more accessory systems in the aircraft not related to said engine, comprising: a bleed air line connected to said engine in the area of said compressor and adapted to pick up compressor bleed air and a ram air line connected to said engine in the area of said ram air inlet duct and adapted to pick up ram air, said lines being connected to said turbine and control means for said lines operable selectively to apply air from one or the other of said lines to said turbine, a supply tank and a supply of liquid evaporant material in said tank, a source of compressed gas connected to said tank and applying pressure on said liquid evaporant material for pressurized supply of the same, a jacket around said ram air line adjacent the location of connection of said ram air line to said inlet duct, said tank being connected to said jacket for supply of liquid evaporant material thereto, said ram air line having injection passageways from said jacket to the interior of said ram air line for supply of said liquid evaporant material to the ram air for cooling the same, and thermostatic control means automatically controlling supply of said liquid evaporant material to the ram air including means sensing the temperature in the accessory system, whereby said evaporant material is added to said ram air when the ram air temperatures exceed the temperature limit of said turbine.

2. The subject matter of claim 1 in which said evaporant material is water.

3. An accessory power system for an aircraft operable at least at Mach 4 having an air powered accessory power turbine, independent of the aircraft propulsion power plant, to supply power to one or more accessory systems in the aircraft not related to the propulsion power plant of the aircraft, comprising: said aircraft having a ram air duct and a ram air line connected to said ram air duct and adapted to pick up ram air, said line being connected to said turbine, supply means including a supply tank and a supply of liquid evaporant material in said tank, a jacket on the outside of said ram air line adjacent the location of connection of said ram air line to said inlet duct, said tank being connected to said jacket and said supply means feeding said liquid evaporant material thereto, said ram air line having injection passageways from said jacket to the interior of said ram air line for supply of said liquid evaporant material to the ram air for cooling the same, and thermostatic control means controlling supply of said liquid evaporant material to the ram air including means sensing the temperature in the accessory system, whereby said evaporant material is automatically added to said ram air when the ram air temperatures exceed the temperature limit of said turbine.

4. An accessory power system for an aircraft operating at velocities of above Mach 4, said aircraft having an air powered accessory power turbine, independent of the aircraft propulsion power plant, to supply power to one or more accessory systems in the aircraft not related to said aircraft propulsion power plant, comprising: said aircraft having a ram air duct and a ram air line connected to said ram air duct and adapted to pick up ram air, said line being connected to said turbine, supply means including a tank and a supply of water in said tank, said tank being connected to said ram air line and said supply means feeding water to said line, and thermostatic control means including means sensing the temperature of the ram air and operating at a temperature near 2000° R. which is the temperature limit of said turbine to automatically control said supply means to feed water to said ram air in sufficient quantity to prevent exceeding said temperature limit of said turbine.

5. An accessory power system for an aircraft operable at least at Mach 4 having an engine including a compressor and a ram air duct and said aircraft having an air powered accessory turbine, independent of the aircraft propulsion power plant which includes said engine, to provide power to one or more accessory systems not related to said engine, comprising: a bleed air line connecting said engine in the area of said compressor to the turbine conveying compressor bleed air, a ram air line connecting said ram air duct to said turbine conveying ram air, valve means for said lines for selectively applying air from one or the other of said lines to said turbine, supply means including a source of evaporant material operative to feed said evaporant material to the ram air in said ram air line, and control means operating automatically to add said evaporant material to the ram air when the ram air temperatures exceed a temperature representing the temperature limits of said turbine.

6. The subject matter of claim 5 in which said evaporant material is water.

7. An accessory power system for an aircraft operable at least at Mach 4 having an air powered accessory turbine, independent of the aircraft propulsion power plant, to provide power to one or more accessory systems not related to said aircraft propulsion power plant, comprising: a ram air duct, a ram air line connecting said duct to said turbine, a tank containing water connected to said ram air line, and control means operating automatically to add said water from said tank to the ram air in said line when the ram air temperatures exceed a temperature representing the temperature limits of said turbine.

8. An accessory power system for an aircraft operable at least at Mach 4 having an air powered accessory turbine, independent of the aircraft propulsion power plant, to provide power to one or more accessory systems not related to said aircraft propulsion power plant, comprising: a ram air duct, a ram air line connecting said duct to said turbine, supply means including a source of evaporant material operative to feed said evaporant material to the ram air in said line, and control means operating automatically to add said evaporant material to the ram air when the ram air temperatures exceed a temperature representing the temperature limits of said turbine.

References Cited in the file of this patent
UNITED STATES PATENTS

| | | |
|---|---|---|
| 2,469,679 | Wyman | May 10, 1949 |
| 2,549,819 | Kane | Apr. 24, 1951 |
| 2,608,054 | Price | Aug. 26, 1952 |
| 2,612,020 | Griffith | Sept. 30, 1952 |
| 2,648,196 | Mullen et al. | Aug. 11, 1953 |
| 2,835,470 | Trowbridge et al. | May 20, 1958 |
| 2,851,863 | Theed | Sept. 16, 1958 |
| 2,920,447 | Hollings | Jan. 12, 1960 |